United States Patent
Suto et al.

(10) Patent No.: US 11,468,638 B2
(45) Date of Patent: Oct. 11, 2022

(54) AUGMENTED REALITY OBJECT MOVEMENT ASSISTANT

(71) Applicant: KYNDRYL, INC., New York, NY (US)

(72) Inventors: Tiberiu Suto, Franklin, NY (US); Kelly Camus, Durham, NC (US); Zachary A. Silverstein, Austin, TX (US); Andrew R. Jones, Round Rock, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/130,147

(22) Filed: Dec. 22, 2020

(65) Prior Publication Data

US 2022/0198754 A1 Jun. 23, 2022

(51) Int. Cl.
G06T 19/00 (2011.01)
G06T 7/73 (2017.01)
G06Q 50/28 (2012.01)

(52) U.S. Cl.
CPC ........... G06T 19/003 (2013.01); G06Q 50/28 (2013.01); G06T 7/75 (2017.01); G06T 19/006 (2013.01)

(58) Field of Classification Search
CPC .... G06T 7/70; G06T 7/73; G06T 7/75; G06T 19/003; G06T 19/00; G06Q 50/28
See application file for complete search history.

(56) References Cited

U.S. PATENT DOCUMENTS 9,449,342 B2 9/2016 Sacco
10,127,606 B2 11/2018 Tapley
10,339,490 B1* 7/2019 Joshi ................. G06Q 10/0832
10,373,377 B1 8/2019 Niewiadomski
10,388,070 B2 8/2019 Spivack
(Continued)

FOREIGN PATENT DOCUMENTS

JP 2014069907 A 4/2014
KR 20120076459 A 7/2012

OTHER PUBLICATIONS

Wikipedia. "3D Rendering." Accessed Jul. 21, 2020. 5 pages. Published by Wikipedia. https://en.wikipedia.org/wiki/3D_rendering.
(Continued)

Primary Examiner — Diane M Wills
(74) Attorney, Agent, or Firm — Ken Han; Andrew M. Calderon; Calderon Safran & Cole P.C.

(57) ABSTRACT

A processor may receive physical parameter data associated with a physical parameter of an object. The processor may receive pathway data associated with one or more potential pathways for transporting the object from an origin point to a destination point. The processor may determine a recommended pathway, the recommended pathway may have one or more path segments for transportation of the object from the origin point to the destination point. The processor may determine a first recommended orientation and a first recommended movement for transportation of the object through a first path segment of the recommended path. The processor may provide, to a user, a virtual rendering of the first recommended orientation and the first recommended movement of the object through the first path segment of the recommended path.

18 Claims, 5 Drawing Sheets

(56) References Cited

U.S. PATENT DOCUMENTS

| | | | |
|---|---|---|---|
| 2005/0184866 A1 | 8/2005 | Silver | |
| 2013/0120224 A1* | 5/2013 | Cajigas | G09G 5/00 345/8 |
| 2018/0336732 A1* | 11/2018 | Schuster | G06Q 10/0875 |
| 2019/0171780 A1* | 6/2019 | Santarone | G02B 27/0172 |
| 2020/0074386 A1 | 3/2020 | Mossoba | |

OTHER PUBLICATIONS

Anonymous. "AirMeasure." Accessed Jul. 21, 2020. 8 pages. Published by AirMeasure. http://armeasure.com/.

Anonymous. "Scalable Cloud based SaaS Augmented Reality Content Creation Platform for Your Brand." Accessed Jul. 21, 2020. 4 pages. Published by The ROAR. https://theroar.io/.

Bienenstock, Russell. "Smarter, Faster, More Efficient Delivery—Part 2." Published Sep. 23, 2017. Accessed Jul. 21, 2020. 7 pages. Published by Furniture World. https://furninfo.com/furniture-world-articles/3697.

Gibbs, Philip. "A Computational Study of Sofas and Cars." Published Nov. 2014. 9 pages. Published by Research Gate. https://www.researchgate.net/publication/311900489_A_Computational_Study_of_Sofas_and_Cars.

Kallus, Y., et al., "Improved upper bounds in the moving sofa problem." Published Oct. 12, 2018. 28 pages. Published by ARXIV. https://arxiv.org/abs/1706.06630.

Mell, et al., "The NIST Definition of Cloud Computing," Recommendations of the National Institute of Standards and Technology, U.S. Department of Commerce, Special Publication 800-145, Sep. 2011, 7 pgs.

Tillman, Maggie. "10 best ARKit apps 2020: Our pick of iOS augmented reality apps." Published May 12, 2020. Accessed Jul. 21, 2020. 8 pages. Published by PocketLint. https://www.pocket-lint.com/ar-vr/news/apple/142315-best-arkit-enabled-augmented-reality-apps-for-iphone-ipad.

Tyrrell, Brian. "Investigating the use of a genetic algorithm to obtain numerical solutions to the Moving Sofa Problem." Published Jul. 2015. 103 pages. https://www.maths.tcd.ie/~btyrrel/genetic.pdf.

Wagner, Neil. "The Sofa Problem." Published Mar. 1976. 3 pages. vol. 83, No. 3. The American Mathematical Monthly, pp. 188-189. Published by The Mathematical Association of America.

* cited by examiner

AUGMENTED REALITY OBJECT MOVEMENT ASSISTANT

BACKGROUND

The present disclosure relates generally to the field of augmented reality simulation, and more specifically to providing a virtual rendering of an object transported along a recommended pathway.

Augmented reality technology superimposes a computer-generated image onto another image to generate a composite image. Additionally, transportation of an object may be hindered by physical conditions of the object and the surroundings of the object.

SUMMARY

Embodiments of the present disclosure include a method, computer program product, and system for providing a virtual rendering of an object transported along a recommended pathway.

A processor may receive physical parameter data associated with a physical parameter of an object. The processor may receive pathway data associated with one or more potential pathways for transporting the object from an origin point to a destination point. The processor may determine a recommended pathway, the recommended pathway may have one or more path segments for transportation of the object from the origin point to the destination point. The processor may determine a first recommended orientation and a first recommended movement for transportation of the object through a first path segment of the recommended path. The processor may provide, to a user, a virtual rendering of the first recommended orientation and the first recommended movement of the object through the first path segment of the recommended path.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
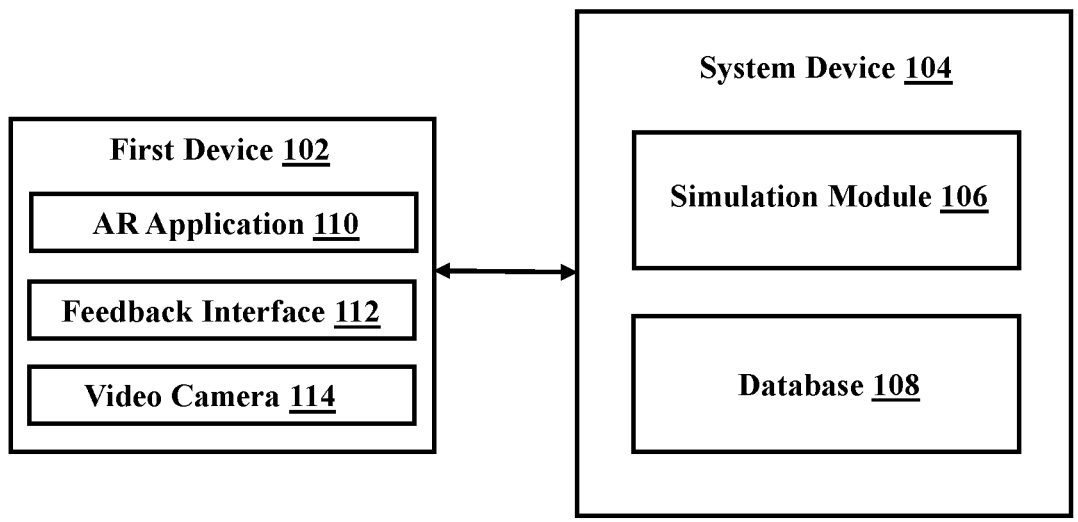
FIG. 1 is a block diagram of an exemplary system for an object movement assistant, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to augmented reality simulation, and more specifically to providing a virtual rendering of an object transported along a recommended pathway. While the present disclosure is not necessarily limited to such applications, various aspects of the disclosure may be appreciated through a discussion of various examples using this context.

In some embodiments, a processor may receive physical parameter data associated with a physical parameter of an object. In some embodiments, the physical parameter data may provide information about physical characteristics of the object. In some embodiments, physical parameter data may include dimensions of the object, the weight of the object, dimensions or weight of the object without external packaging, instructions for disassembling the object into components, the weight and dimensions of the disassembled components, information about the materials from which the object is made (e.g., the object is made of glass or the object is made of a spongy material that can shrink to ¾ of its volume when force is applied), information about care of the object during its transportation (e.g., the object is fragile and should not be dropped), etc.

For example, the object may be a sofa. The physical parameter data for the sofa may include the dimensions of the sofa (height, width, length, height of the back portion of the sofa, height of the base portion of the sofa, height of the arm portion of the sofa, etc.), the weight of the sofa, instructions for removing the feet of a sofa (e.g., requires a 9/16 inch hexagonal wrench and reduces height by three inches), information about how many inches the cushions forming the back portion of the sofa can be compressed (reducing the height of the back portion of the sofa by one inch), and information that the material on the arms of the sofa is delicate/scratches easily.

In some embodiments, the physical parameter data may be obtained from the seller/supplier of the object. In some embodiments, the physical parameter data may be obtained by a user scanning the object using an augmented reality or video capturing device that has dimension scanning technology. The dimension scanning technology may be a video camera that has a ruler or other measurement tool (e.g., as firmware or software) which allows the dimensions of an object to be measured as an image or video of the object is captured.

In some embodiments, the processor may receive pathway data associated with one or more potential pathways for transporting the object from an origin point to a destination point. Continuing the previous example, the pathway data may map potential pathways for carrying the sofa from its origin point in a moving van on the driveway of a house to its destination point, the second-floor living room of the house. In some embodiments, the pathway data may be associated with more than one potential pathway for transporting the object because there may be more than one way to go from the driveway to the second-floor living room. For example, one potential pathway may be to enter the house using the front door, go through the front entryway, up the internal staircase, through the landing, and into the second-floor living room. Another potential pathway may be to go to the backyard, enter the house through the backdoor, go through the dining room, through the interior doorway separating the dining room from the first-floor living room, up the internal staircase, through the landing, and into the second-floor living room.

In some embodiments, the pathway data associated with one or more potential pathways may be obtained using a sensor (video camera, camera, thermal sensor, radar, GPS tracker, etc.) that is moved through or around the potential pathways. For example, a user may use a video camera on a mobile phone to capture a video of the potential pathways as the user moves from the driveway, through the house, and into the second-floor living room using the multiple potential pathways (e.g., through the front door or through the backdoor and the various routes from those entrances to the second-floor living room). In some embodiments, the pathway data may be already available (e.g., previously obtained) from a prior use of the presently disclosed technology when the user transported another object. In some embodiments, the pathway data may be provided by a central information source (e.g., an apartment building's management may have potential pathway data available for multiple apartment units with the same or similar layouts).

In some embodiments, the processor may (automatically) determine a recommended pathway. In some embodiments, the recommended pathway may have one or more path segments for transportation of the object from the origin point to the destination point. Continuing the previous example, the user may be recommended to carry the sofa from the driveway to the second-floor living room using the pathway that uses the back entrance of the house. The recommended pathway may be broken down into one or more path segments, where the path segments are portions or components of the recommended pathway. For example, the path segments may include a segment from the driveway to the backyard, a segment through the backward to the backdoor, a segment through the backdoor of the house, a segment through the dining room adjacent to the deck, a segment through the interior doorway separating the dining room from the first-floor living room, a segment up the internal staircase, a segment through the landing, and a segment from the landing into the second-floor living room.

In some embodiments, the recommended pathway may be determined based on ease of transportation of the object through the recommended pathway, and may include factors such as whether an object will fit along the pathway, whether the object has to be disassembled, whether other objects along the path have to be moved (e.g., furniture or fixtures removed), the length of the pathway, whether the pathway includes higher or lower burdens to the movers (e.g., use of dolly, carrying the object up stairs, careful maneuvering required to fit an object in an elevator, etc.).

In some embodiments, the processor may determine a first recommended orientation and a first recommended movement for transportation of the object through a first path segment of the recommended path. For example, while moving the sofa from the driveway through the backyard, it may be recommended that the sofa be carried upright (e.g., in the orientation that it would be placed in a room, with the base on the ground, and the seats facing upwards), by two movers on opposite ends of the length of the sofa (the ends along the dimension on which people sit). It may be recommended that the movers minimize the time that someone is walking facing backwards. It may be recommended that the sofa be oriented facing (e.g., front of the sofa facing) the direction of movement so that both movers can move by shuffling sideways and are able to see the path along which they are moving by turning their heads to the side (e.g., no mover is facing backwards).

The first recommended orientation and the first recommended movement may specify how the object is to be positioned and moved through the first path segment, including: how the object fits in the pathway (e.g., the sofa has to be positioned vertically in an elevator), which dimension of the object goes along which dimension of the pathway (e.g., the height of the sofa fits through the width of a doorway), which dimensions are going to be a tight/close fit in the pathway (e.g., the height of the sofa is only 2 inches less than the width of the doorway), whether the object needs to be disassembled (e.g., remove the feet of the sofa to reduce its height by a few inches), whether additional care is needed based on the materials of the object (e.g., when surfaces of the sofa that are not the base of the sofa are put on the ground, those surfaces should be covered in a protective cover to prevent scratching the sofa fabric), in what direction it needs to be moved (e.g., forward, backwards, rotated clockwise), along which dimension the object needs to be moved (e.g., rotated clockwise along the axis which goes through the length of the sofa), how it should be moved or maneuvered (e.g., by two people lifting it, by two people lifting it and then walking, by one person carrying it, using a dolly, with one person holding the base and another person pushing to the top to rotate the object), etc.

In some embodiments, the processor may provide, to a user, a virtual rendering of the first recommended orientation and the first recommended movement of the object through the first path segment of the recommended path to the user. In some embodiments, the virtual rendering may be provided on a graphical interface on a computing device (e.g., display of a mobile phone). In some embodiments, the virtual rendering may be provided in an augmented reality space which shows the object's movement and orientation through one or more path segments of the recommended pathway and may include virtual representations of other objects or features in the space (e.g., additional furniture, light fixtures, etc.). In some embodiments, the virtual rendering may be provided on a virtual reality device (e.g., virtual reality glasses, a mobile device, etc.). In some embodiments, the virtual rendering may be an illustration of the object's orientation and/or movement (e.g., showing an outline of the object within the boundaries of the pathway). In some embodiments, the virtual rendering may be a video that shows the object's movement and orientation through the first path segment.

In some embodiments, the processor may determine a second recommended orientation and a second recommended movement for transportation of the object through a second path segment of the recommended path. In some embodiments, the second recommended movement may include displayed instructions associated with altering the orientation of the object from the first recommended orientation to the second recommended orientation. In some embodiments, the recommended pathway may have multiple path segments with a potentially different orientation and movement recommended in or through some of the path segments.

Continuing the previous example, to get the sofa through the backdoor, it may be recommended that the two movers orient themselves, by walking along an arc while holding the sofa, so that one mover has her back to the backdoor of the house. It may be recommended that mover should walk backwards through the backdoor of the house while the other mover walks facing forward through the backdoor of the house. It may be recommended that the sofa be rotated 90° counterclockwise, along an imaginary axis running along the length of the sofa (the dimension along which people sit on the sofa) so that the height of the sofa is the dimension of the sofa that fits through the width of the doorway. It may also be recommended that the feet of the sofa be removed to reduce a few inches from the sofa's height.

In some embodiments, the processor may provide a virtual rendering of the second recommended orientation and the second recommended movement of the object through the second path segment of the recommended path to the user. In some embodiments, the virtual rendering may be one or more illustrations of the object's orientation and/or movement through the second path segment (e.g., showing an outline of the object within the boundaries of the pathway). In some embodiments, the virtual rendering may illustrate alteration of the orientation of the object from the first recommended orientation to the second recommended orientation. In some embodiments, the virtual rendering may be a video that shows the object's movement and orientation from the first path segment through the second path segment (and includes alteration of the orientation of the object from the first recommended orientation to the second recommended orientation).

In some embodiments, the pathway data may be obtained by utilizing a measuring tool to capture spacing and dimensions of the one or more potential pathways. In some embodiments, the measuring tool may utilize digital rulers or digital sizing. In some embodiments, the digital rulers may be built into an image or video capturing application or device. In some embodiments, the image or video capturing application or device may be a component of an augmented reality device, a portable computing device, or a virtual reality device. For example, a user may utilize a measuring tool on a video capture application on a mobile phone to take an image or video of the one or more potential pathways. The measuring tool may be used to determine the dimensions of the pathways (e.g., hallway, living room, backyard) and the location and dimensions of openings and obstructions along the path (e.g., doorways, walls, windows, furniture, and other fixtures (light fixtures, fire alarms, security cameras)).

In some embodiments, the pathway data may map risk points along the one or more potential pathways. In some embodiments, the risk points may relate to the size and dimensions of the potential pathway in comparison to the object (e.g., the size of the object is within a threshold of the size of the potential pathway, or a sofa needs to be carried completely vertically to fit through that path segment), obstructions along the path (e.g., protrusions on the railing of a narrow staircase which further narrow the available space for transporting an object, or a step between rooms (which can easily be missed)), nearby furniture or fixtures (e.g., there is a painting on the wall that could be damaged when scraped by a sofa, low hanging household fixtures such as lights), or other attributes of the potential pathway that others have found difficult to move an object near (e.g., other users of the presently disclosed technology). The risk points may also include changeable constraints. For example, a hallway may have a hallway table that is removable, a doorknob may be removed from an open door to provide two additional inches of space for an object to move through the doorframe, etc.

In some embodiments, the processor may receive feedback regarding at least one of the first recommended orientation, the second recommended orientation, the first recommended movement, and the second recommended movement. In some embodiments, the processor may receive at least one of revised physical parameter data and revised pathway data. In some embodiments, the revised physical parameter data and the revised pathway data may be obtained by a recalibration of a measuring tool on a device. For example, the user may provide feedback indicating that it was not possible to transport the object (e.g., move the sofa) along a particular portion of the recommended pathway (e.g., up a staircase).

In some embodiments, the user may be prompted to obtain the physical parameter data or the pathway data again after recalibrating the measuring tool on the media capture device (e.g., a video camera or augmented reality device). In some embodiments, the processor may provide a revised recommended pathway. For example, after the receiving revised physical parameter data indicating that the sofa is one inch longer than previously measured and after receiving revised pathway data indicating that there is an obstruction (e.g., a fire suppression sprinkler) on the roof of the elevator which reduces the available height of the elevator, the processor may recommend that the object be transported up a staircase rather than using the elevator. In some embodiments, the processor may alter the recommended pathway as the progress of the transportation is monitored. In some embodiments, the second path segment of the recommended path may be the next segment along the recommended pathway after the first path segment towards the destination point. In some embodiments, the second path segment may be a path segment needed to backtrack or take an altered recommended pathway.

In some embodiments, the processor may receive movement data, the movement data may be associated with how the object is transported through the first path segment of the recommended path (e.g., moved correctly as provided by the recommended path, the object and/or path has had recommended movables removed, etc.). In some embodiments, the processor may provide feedback regarding how the object is transported through the first path segment of the recommended path. For example, a user may take a video of the movers moving the sofa up a staircase. The video data may show mistakes that the movers are making in the movement, orientation, or a courier feature (explained below) for transportation of the object through the path segment. For example, to carry the sofa up a narrow staircase, it may be recommended that the sofa be rotated 90°, but the movers only rotated the sofa 85°, which altered the dimension of the sofa that must fit through the width of the narrow staircase. The processor may provide feedback to correct the rotation/orientation of the sofa. It may be recommended that the movers walk up the staircase in unison and rest every two stairs.

However, the video may capture that the mover at the top of the staircase rests after every two stairs but the mover at the bottom of the staircase does not rest, which potentially may injure the movers. The processor may provide feedback data to correct this deviation from the recommended movement. In some embodiments, the feedback data could provide a confirmation of the approach taken (e.g., the first orientation and first movement); auditory, textual, or visual instructions for adjustments to the orientation or movement; or disapproval of the first orientation and first movement (e.g., the sofa will not fit in the elevator).

In some embodiments, the movement data may be captured by an image capturing sensor (e.g., a camera) or another sensor (e.g., radar, thermal imaging sensor) that is part of a virtual reality device worn by a user (e.g., virtual reality glasses, with the image capturing or other sensor located on or near the virtual reality glasses). In some embodiments, the feedback may be provided through the virtual reality device (e.g., an image or video showing a virtual sofa being carried up a staircase may show the sofa being rotated an additional 5° to correct the dimension of the sofa going through a narrow path). In some embodiments, the feedback may be provided on an augmented reality device (e.g., a visual depiction of the sofa being rotated and carried up the staircase displayed on a display of a smartphone).

In some embodiments, determining the first recommended orientation and the first recommended movement of the object may include providing a recommended courier feature for movement of the object along the first path segment of the recommended path. In some embodiments, the recommended courier feature may provide recommendations about the individual(s) (e.g., movers or couriers) transporting the object or suggest orientations and movements for the object based on information about the couriers doing the transporting. In some embodiments, the recommended courier feature may specify where to grip the object (e.g., hold the sofa from its base rather than from its side), how multiple couriers should transport the object and/or work in unison given the characteristics of the movers, and provide certain instructions to certain movers which factors in the characteristics of the movers (e.g., the object should be transported on a dolly when only two movers are available but can be lifted by three movers), etc.

Referring now to FIG. 1, a block diagram of a network 100 for an object movement assistant is illustrated. Network 100 includes a first device 102 and a system device 104. The first device 102 and the system device 104 are configured to be in communication with each other. In some embodiments, the first device 102 and/or the system device 104 may be any devices that contain a processor configured to perform one or more of the functions or steps described in this disclosure. System device 104 includes a twin simulation engine/module 106 and a database 108 for storing data associated with physical parameter data, pathway data, recommended movements, recommended orientations, recommended courier features, etc.

In some embodiments, a processor of the system device 104 receives physical parameter data associated with a physical parameter of an object and pathway data associated with one or more potential pathways for transporting the object from an origin point to a destination point. In some embodiments, the pathway data is obtained by utilizing a measuring tool to capture spacing and dimensions of the one or more potential pathways. In some embodiments, the physical parameter data is obtained by utilizing a measuring tool on an augmented reality device.

In some embodiments, the simulation engine/module 106 determines a recommended pathway. In some embodiments, the recommended pathway includes one or more path segments for transportation of the object from the origin point to the destination point. In some embodiments, the simulation engine/module 106 determines a first recommended orientation and a first recommended movement for transportation of the object through (e.g., in, out, and within) a first path segment of the recommended path. In some embodiments, determining the first recommended orientation and the first recommended movement of the object includes providing a recommended courier feature for movement of the object along the first path segment of the recommended path. In some embodiments, a virtual rendering of the first recommended orientation and the first recommended movement of the object through the first path segment is provided to the user on an augmented reality application 110 of the first device 102.

In some embodiments, the simulation engine/module determines a second recommended orientation and a second recommended movement for transportation of the object through a second path segment of the recommended path. In some embodiments, the second recommended movement includes displayed instructions associated with altering the orientation of the object from the first recommended orientation to the second recommended orientation. In some embodiments, a virtual rendering of the second recommended orientation and the second recommended movement of the object through the second path segment is provided to the user on the augmented reality application 110 of the first device 102.

In some embodiments, the processor of the system device 104 receives feedback regarding at least one of the first recommended orientation, the second recommended orientation, the first recommended movement, and the second recommended movement. In some embodiments, the feedback is provided by the user via a feedback interface 112 of the first device 102 to the system device 104. In some embodiments, the user obtains at least one of revised physical parameter data and revised pathway data after recalibrating a measuring tool. In some embodiments, the measuring tool is on an augmented reality application 110 of the first device 102.

In some embodiments, movement data is captured by a user using the video camera 114 of the first device 102. The movement data shows how the object is transported through the first path segment of the recommended path. The simulation engine/module 106 receives the movement data and provides feedback regarding how the object is transported through the first path segment of the recommended path. In some embodiments, the feedback is provided to the user via the augmented reality application 110.

Figure 2:
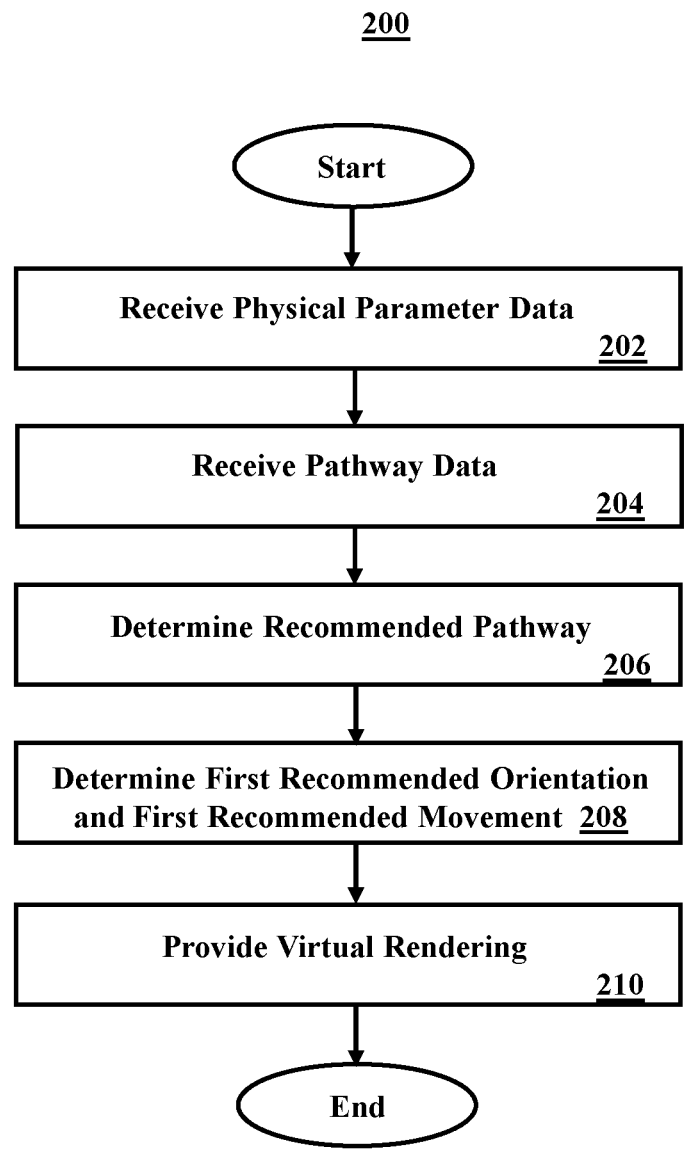
FIG. 2 is a flowchart of an exemplary method for an object movement assistant, in accordance with aspects of the present disclosure.

Referring now to FIG. 2, illustrated is a flowchart of an exemplary method 200 for utilizing an object movement assistant, in accordance with embodiments of the present disclosure. In some embodiments, a processor of a system may perform the operations of the method 200. In some embodiments, method 200 begins at operation 202. At operation 202, the processor receives physical parameter data associated with a physical parameter of an object. In some embodiments, method 200 proceeds to operation 204, where the processor receives pathway data associated with one or more potential pathways for transporting the object from an origin point to a destination point. In some embodiments, method 200 proceeds to operation 206. At operation 206, the processor determines a recommended pathway, the recommended pathway having one or more path segments for transportation of the object from the origin point to the destination point. In some embodiments, method 200 proceeds to operation 208. At operation 208, the processor determines a first recommended orientation and a first recommended movement for transportation of the object through a first path segment of the recommended path. In some embodiments, method 200 proceeds to operation 210. At operation 210, the processor provides to the user a virtual rendering of the first recommended orientation and the first recommended movement of the object through the first path segment of the recommended path.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
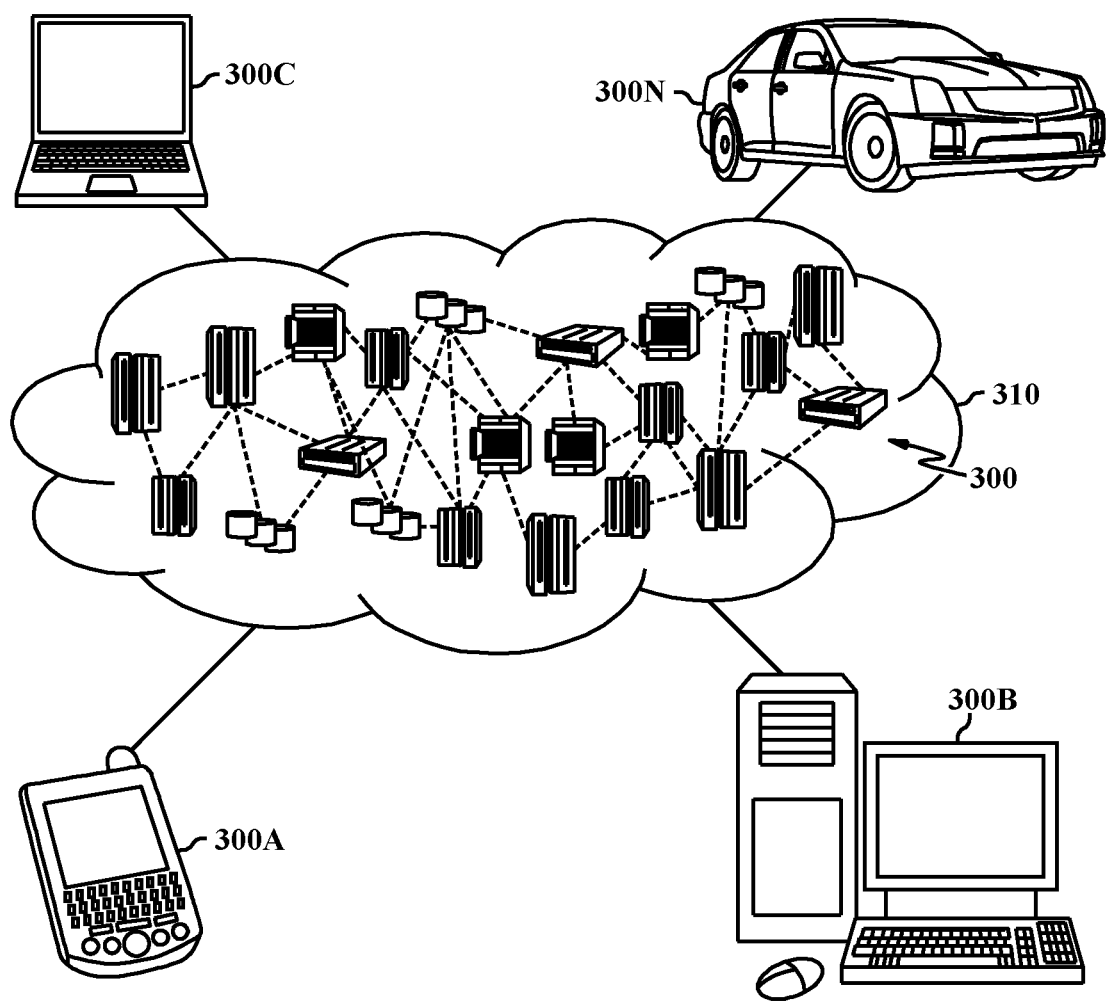
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
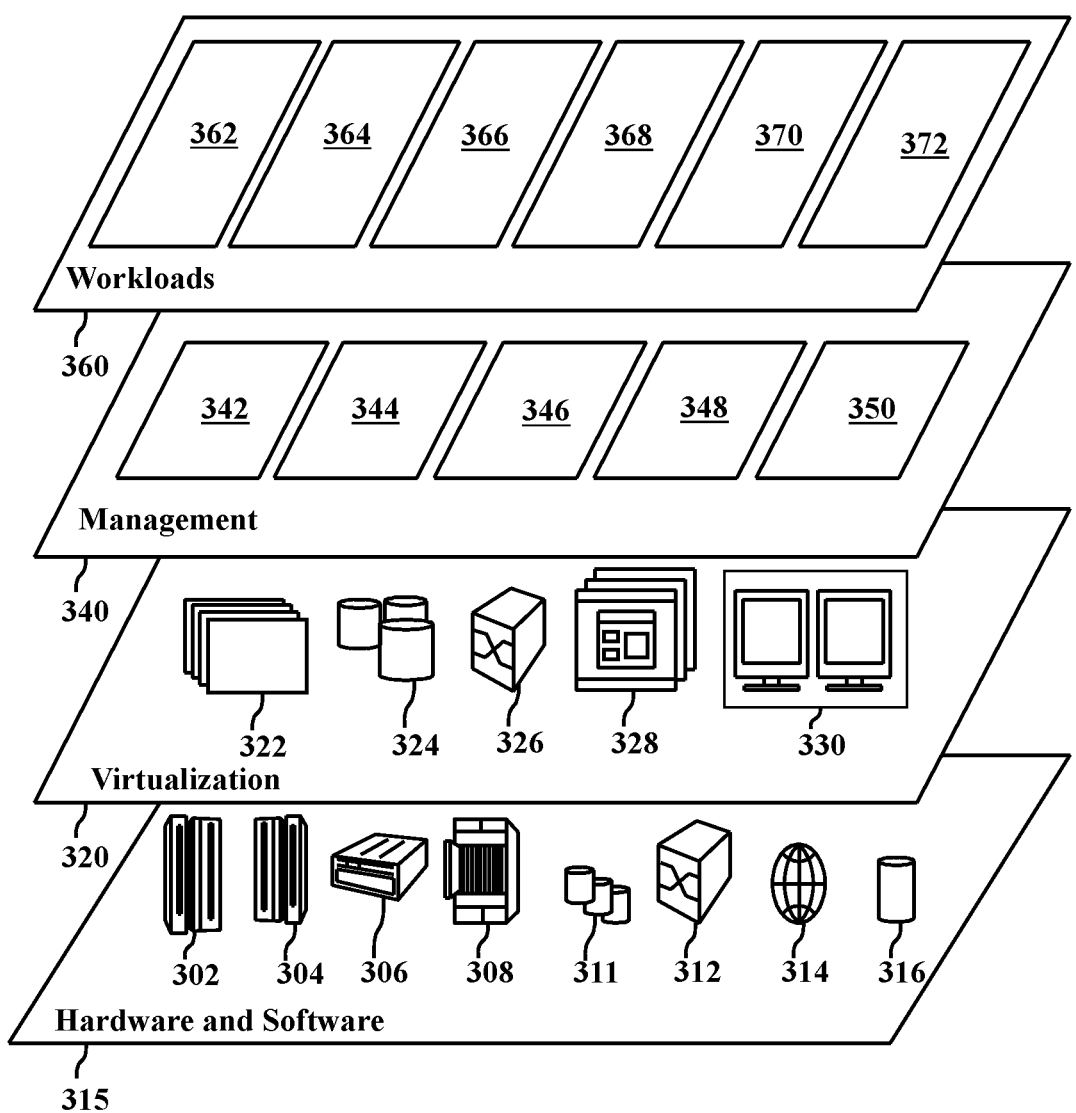
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and utilizing an object movement assistant 372.

Figure 4:
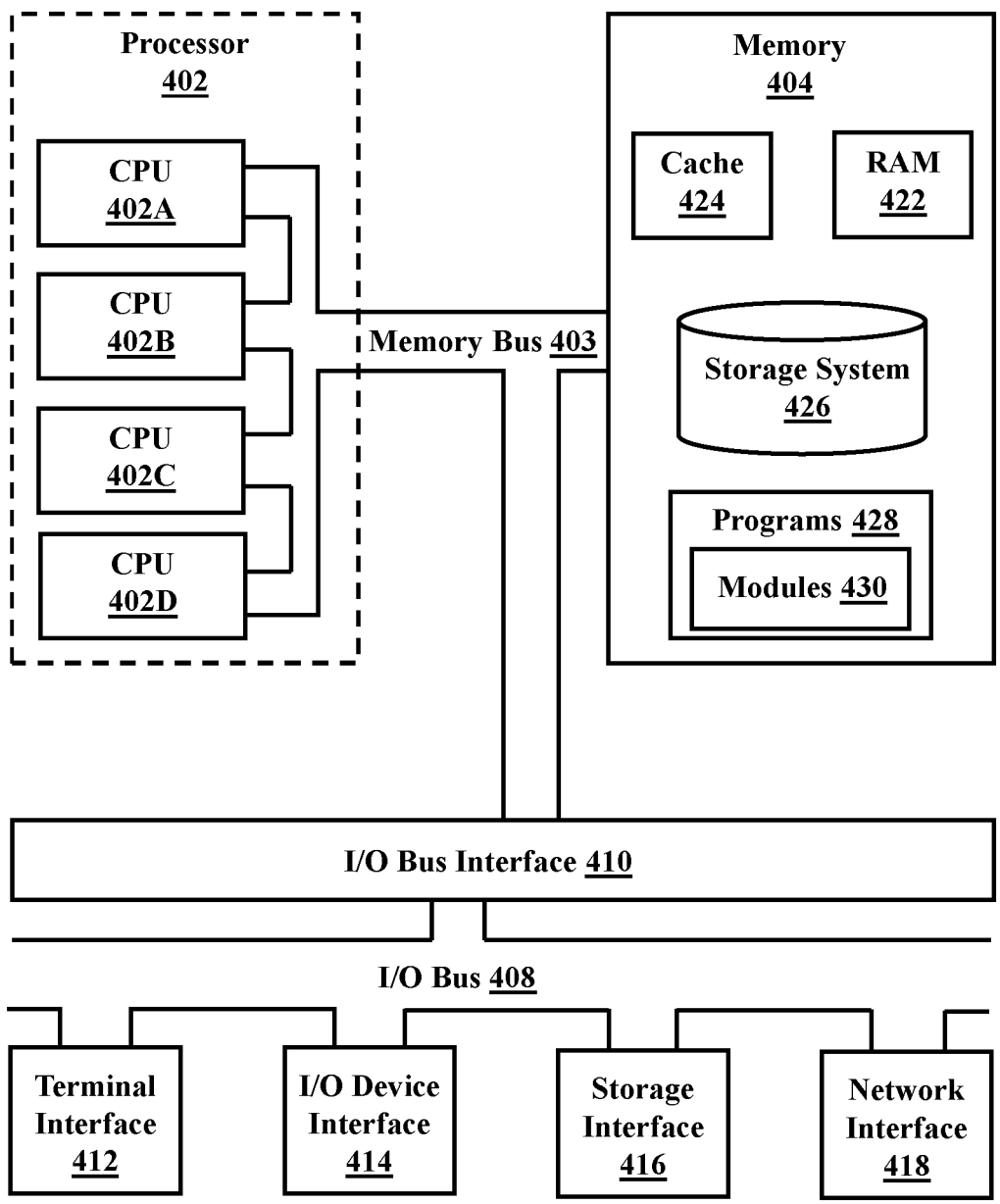
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for intercomponent communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method, the method comprising:
receiving, by a processor, physical parameter data associated with a physical parameter of an object;
receiving pathway data associated with one or more potential pathways for transporting the object from an origin point to a destination point;
determining a recommended pathway, the recommended pathway having one or more path segments for transportation of the object from the origin point to the destination point;
determining a first recommended orientation and a first recommended movement for transportation of the object through a first path segment of the recommended path; and
providing, to a user, a virtual rendering of the first recommended orientation and the first recommended movement of the object through the first path segment of the recommended path,
wherein determining the first recommended orientation and the first recommended movement for transportation of the object includes providing a recommended courier feature for movement of the object along the first path segment of the recommended path.

2. The method of claim 1, further comprising:
determining a second recommended orientation and a second recommended movement for transportation of the object through a second path segment of the recommended path, wherein the second recommended movement includes displayed instructions associated with altering the orientation of the object from the first recommended orientation to the second recommended orientation; and
providing a virtual rendering of the second recommended orientation and the second recommended movement of the object through the second path segment of the recommended path to the user.

3. The method of claim 2, further comprising:
receiving feedback regarding at least one of the first recommended orientation, the second recommended orientation, the first recommended movement, and the second recommended movement; and
receiving at least one of revised physical parameter data and revised pathway data, wherein the revised physical parameter data and the revised pathway data are obtained by a recalibration of a measuring tool on a device.

4. The method of claim 2, further comprising:
receiving movement data, the movement data associated with how the object is transported through the first path segment of the recommended path; and
providing feedback regarding how the object is transported through the first path segment of the recommended path.

5. The method of claim 1, wherein: the object is furniture; the virtual rendering is provided in an augmented reality space; and the virtual rendering shows orientation of the furniture and movement of the furniture along the first path segment of the recommended path.

6. The method of claim 1, wherein the pathway data is obtained by utilizing a measuring tool to capture spacing and dimensions of the one or more potential pathways, and the first recommended orientation and the first recommended movement include instructions to disassemble the object so that the object will fit while being moved through the first path segment.

7. The method of claim 1, wherein the courier feature is based on information about individual people transporting the object.

8. A system comprising:
a memory; and
a processor in communication with the memory, the processor being configured to perform operations comprising:
receiving physical parameter data associated with a physical parameter of an object;
receiving pathway data associated with one or more potential pathways for transporting the object from an origin point to a destination point;
determining a recommended pathway based on ease of transporting the object through the recommended pathway, the recommended pathway having one or more path segments for transportation of the object from the origin point to the destination point;
determining a first recommended orientation and a first recommended movement for transportation of the object through a first path segment of the recommended path; and
providing, to a user, a virtual rendering of the first recommended orientation and the first recommended movement of the object through the first path segment of the recommended path,
wherein the pathway data is obtained by utilizing a measuring tool to capture spacing and dimensions of the one or more potential pathways.

9. The system of claim 8, further comprising:
determining a second recommended orientation and a second recommended movement for transportation of the object through a second path segment of the recommended path, wherein the second recommended movement includes displayed instructions associated with altering the orientation of the object from the first recommended orientation to the second recommended orientation; and
providing a virtual rendering of the second recommended orientation and the second recommended movement of the object through the second path segment of the recommended path to the user.

10. The system of claim 9, further comprising:
receiving feedback regarding at least one of the first recommended orientation, the second recommended orientation, the first recommended movement, and the second recommended movement; and
receiving at least one of revised physical parameter data and revised pathway data, wherein the revised physical parameter data and the revised pathway data are obtained by a recalibration of a measuring tool on a device.

11. The system of claim 9, further comprising:
receiving movement data, the movement data associated with how the object is transported through the first path segment of the recommended path; and
providing feedback regarding how the object is transported through the first path segment of the recommended path.

12. The system of claim 8, wherein the virtual rendering is provided in an augmented reality space.

13. A computer program product comprising a computer readable storage medium having program instructions embodied therewith, the program instructions executable by a processor to cause the processor to perform operations, the operations comprising:
receiving physical parameter data associated with a physical parameter of an object;
receiving pathway data associated with one or more potential pathways for transporting the object from an origin point to a destination point;
determining a recommended pathway, the recommended pathway having one or more path segments for transportation of the object from the origin point to the destination point;
determining a first recommended orientation and a first recommended movement for transportation of the object through a first path segment of the recommended path; and
providing, to a user, a virtual rendering of the first recommended orientation and the first recommended movement of the object through the first path segment of the recommended path,
wherein the recommended pathway is determined based on ease of transporting the object through the recommended pathway based on: whether the object will fit along the recommended pathway; whether the object must be disassembled to be transported along the recommended pathway; and whether other objects along the recommended pathway must be moved to transport the object along the recommended pathway.

14. The computer program product of claim 13, further comprising:
determining a second recommended orientation and a second recommended movement for transportation of the object through a second path segment of the recommended path, wherein the second recommended movement includes displayed instructions associated with altering the orientation of the object from the first recommended orientation to the second recommended orientation; and
providing a virtual rendering of the second recommended orientation and the second recommended movement of the object through the second path segment of the recommended path to the user.

15. The computer program product of claim 14, further comprising:
receiving feedback regarding at least one of the first recommended orientation, the second recommended orientation, the first recommended movement, and the second recommended movement; and
receiving at least one of revised physical parameter data and revised pathway data, wherein the revised physical parameter data and the revised pathway data are obtained by a recalibration of a measuring tool on a device.

16. The computer program product of claim 14, further comprising:
receiving movement data, the movement data associated with how the object is transported through the first path segment of the recommended path; and
providing feedback regarding how the object is transported through the first path segment of the recommended path.

17. The computer program product of claim 13, wherein the pathway data is obtained by utilizing a measuring tool to capture spacing and dimensions of the one or more potential pathways.

18. The computer program product of claim 13, wherein determining the first recommended orientation and the first recommended movement of the object includes providing a recommended courier feature for movement of the object along the first path segment of the recommended path.

* * * * *